No. 821,325. PATENTED MAY 22, 1906.
T. E. ADAMS.
BEARING FOR ROCK DRILLS.
APPLICATION FILED JUNE 7, 1905.
2 SHEETS—SHEET 1.
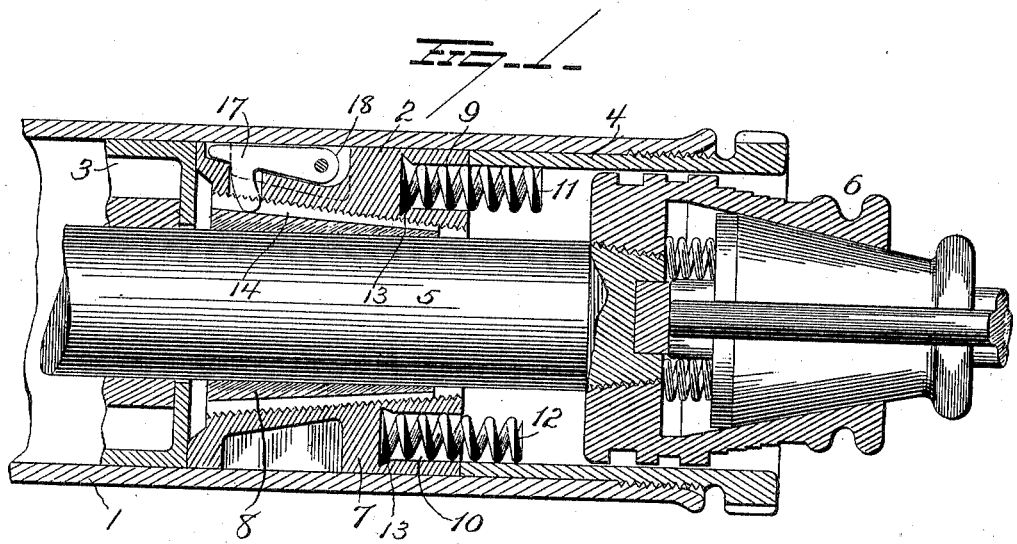
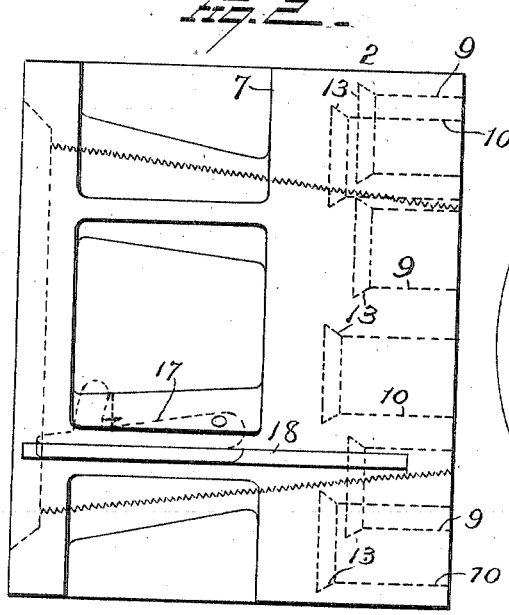
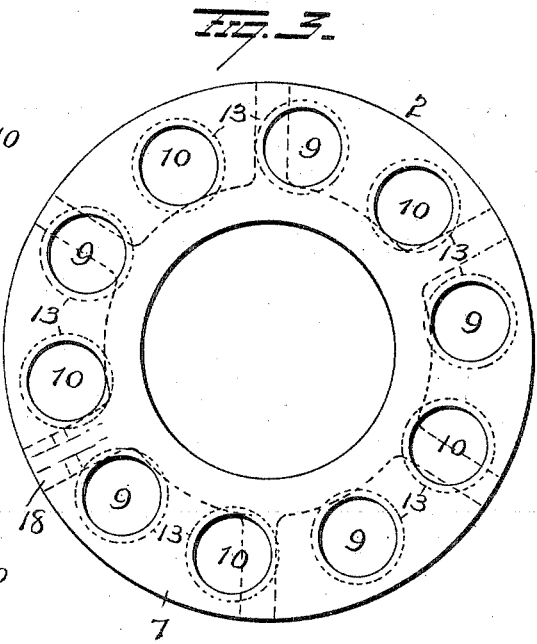
WITNESSES
E. J. Nottingham
G. F. Downing
INVENTOR
T. E. Adams
By H. A. Seymour
Attorney

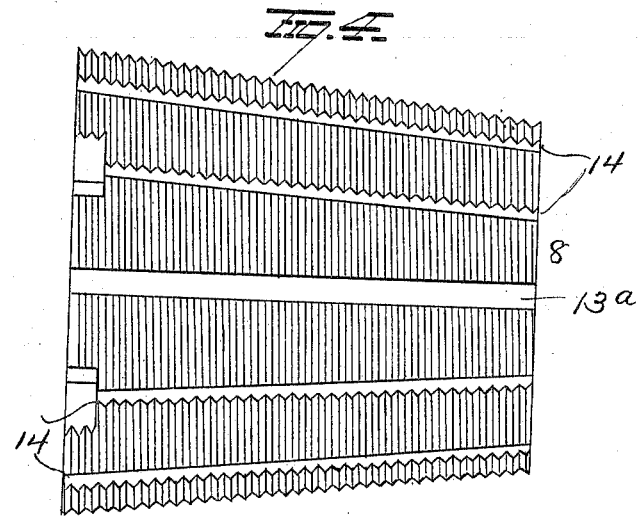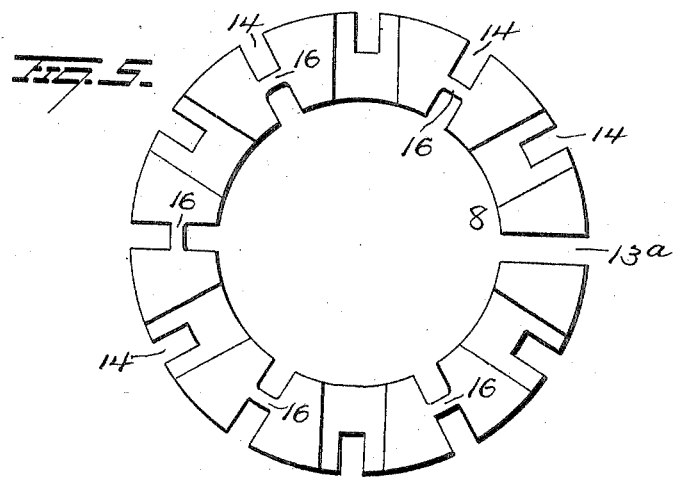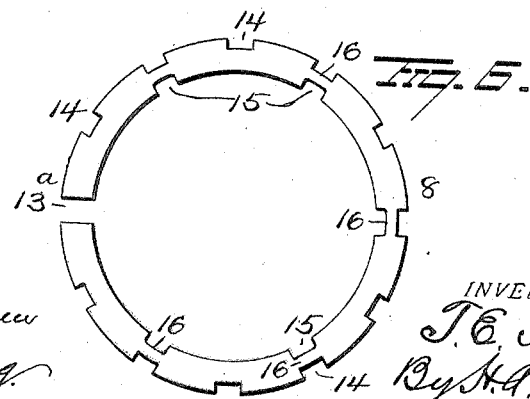

UNITED STATES PATENT OFFICE.

THOMAS EDGAR ADAMS, OF CLEVELAND, OHIO.

BEARING FOR ROCK-DRILLS.

No. 821,325.　　　　Specification of Letters Patent.　　　　Patented May 22, 1906.

Application filed June 7, 1905. Serial No. 264,132.

*To all whom it may concern:*

Be it known that I, THOMAS EDGAR ADAMS, of Cleveland, in the county of Cuyahoga and State of Ohio, have invented certain new and useful Improvements in Bearings for Rock-Drills; and I do hereby declare the following to be a full, clear, and exact description of the invention, such as will enable others skilled in the art to which it appertains to make and use the same.

My invention relates to improvements in bearings for rock-drills, one object of the invention being to provide a simple and efficient shaft bearing or bushing for such apparatus.

A further object is to construct the shaft bearing or bushing in such manner that it can be readily adjusted and then locked securely in position.

A further object is to so construct a shaft bearing or bushing for rock-drills that wear will be reduced to a minimum and the use of fiber lining avoided.

With these objects in view the invention consists in certain novel features of construction and combinations and arrangements of parts, as hereinafter set forth, and pointed out in the claims.

In the accompanying drawings, Figure 1 is a sectional view of a portion of a rock-drill embodying my improvements. Fig. 2 is a side view of the nose-bushing. Fig. 3 is an end view of the same. Fig. 4 is a side view of the conical bearing-sleeve. Fig. 5 is a view of the larger end of said sleeve, and Fig. 6 is a view of the smaller end of said sleeve.

1 represents the barrel of a rock-drill, in which, at a position somewhat inwardly removed from the forward end thereof, a nose-bushing 2 is located, said nose-bushing bearing at its rear end against a part 3, which in drills of this class may be the casing of the ratchet devices. Forward displacement of the nose-bushing is prevented by a sleeve 4, screwed into the forward end of the barrel 1. The nose-bushing 2 constitutes the forward bearing for the drill-rod 5, to the forward end of which the drill-chuck 6 is secured and moves closely within the chamber formed by the sleeve 4. From this construction it will be observed that the end of the barrel overhangs the bearing of the nose-bushing, and the chuck filling the sleeve 4 so nearly effectually prevents grit touching and sticking to the greasy surface of the drill-rod.

The nose-bushing comprises a casing 7, having a conical opening, the wall of which is threaded from end to end, and a conical bearing-sleeve 8, of low-carbon tough steel, threaded exteriorly to enter the threaded opening in the casing 7. The specific construction of this bearing-sleeve will be hereinafter fully explained.

The casing of the nose-bushing is provided at its forward end with two series 9 10 of sockets for the reception of buffing-springs 11 12. The bottom of each socket is undercut, as at 13, and into this undercut portion the end of the buffing-spring is crowded. The pounding of the drill-chuck against the buffing-springs will act to tightly wedge or crowd the last convolution of each spring into the undercut bottom of its socket, and thus displacement of the buffing-springs will be effectually prevented.

It will be observed that the sockets 10 are of greater depth than the sockets 9. The springs 11 and 12, however, are preferably all of the same length. Thus it will be observed that the springs 11 in the sockets 9 project a greater distance forwardly from the casing 7 than do the springs 12 in the sockets 10. Under normal conditions the springs 11 will suffice to act as buffers for the drill-chuck upon the return stroke of the latter, but occasionally the drill-tool will "stick," and when it has been released from the rock the chuck will make the return stroke with abnormal speed and force. When this happens, the buffing-springs 12 will assist in buffing the chuck, and thus relieve the springs 11 of undue strain and punishment. The result is to prolong the life of both sets of springs.

The bearing-sleeve 8, hereinbefore referred to, is slotted from end to end, as shown at 13ª, and to increase the flexibility of said sleeve it is provided exteriorly with a series of longitudinal grooves 14 and interiorly with a series of longitudinal grooves 15, certain of the exterior grooves being directly opposite the interior grooves, leaving comparatively thin webs 16 of metal between them. The exterior grooves 14 also serve to receive (in any one of them) a locking-key 17. This key is pivotally mounted in a slot 18 in the casing 7 of the nose-bushing, and its free end passes through a hole in said casing and enters one of the grooves 14. From this construction it will be observed that the bearing-sleeve can be readily adjusted for wear by screwing it more or less into the casing 7 and that when properly adjusted it can be securely locked by the key 17 entering one of the grooves 14.

The interior grooves 15 also serve an additional function to that before mentioned—viz., they constitute ducts for lubricant.

The inner surface of the bearing-sleeve 8 is case-hardened, so as to present a very hard bearing-face to the rod or shaft which passes through it. In case-hardening the interior of the bearing-sleeve 8 care is exercised to case-harden only the surface which bears against the rod or shaft. The walls of the interior grooves 15 are not case-hardened, nor is the threaded exterior of the sleeve.

I have found in practice that a bearing-sleeve having its interior bearing-face case-hardened, as above explained, shows hardly any wear after a time of service that would wear out a fiber lining.

It is evident that the construction of bearing herein described is useful not only as a nose-bushing for the drill-rod, but may also be used with advantage for the operating-shaft of the drill.

Having fully described my invention, what I claim as new, and desire to secure by Letters Patent, is—

1. A bearing-sleeve of low-carbon tough steel having interior grooves and having a hardened interior face, the latter confined to the portions of the interior face between the grooves.

2. A bearing-sleeve of low-carbon tough steel having a threaded exterior and having interior grooves, and also having a hardened interior face, the hardened portion confined to the portions of the interior face between the grooves.

3. A bearing-sleeve having interior longitudinal grooves, and having a case-hardened interior, the case-hardened interior being confined to the portions between the longitudinal grooves.

4. A bearing-sleeve made conical from end to end and having a slotted wall, said sleeve having exterior longitudinal grooves and internal longitudinal grooves, and the inner surface of said sleeve being hardened between said internal grooves.

5. The combination with a casing having a conical opening therein provided with a threaded wall, of a slotted conical bearing-sleeve having a threaded exterior, and having external longitudinal grooves, and a key attached to the casing and adapted to enter any one of said grooves.

6. The combination with a casing having a conical opening provided with a threaded interior, of a bearing-sleeve having a threaded exterior, and a key pivotally attached to the casing and adapted to engage the bearing-sleeve.

In testimony whereof I have signed this specification in the presence of two subscribing witnesses.

THOMAS EDGAR ADAMS.

Witnesses:
F. W. SINDAM,
J. H. WORBS.